Feb. 23, 1954
R. P. APPLEGATE
2,670,166
YIELDABLE SHIPPING MOUNT FOR MISSILES AND THE LIKE
Filed June 21, 1952
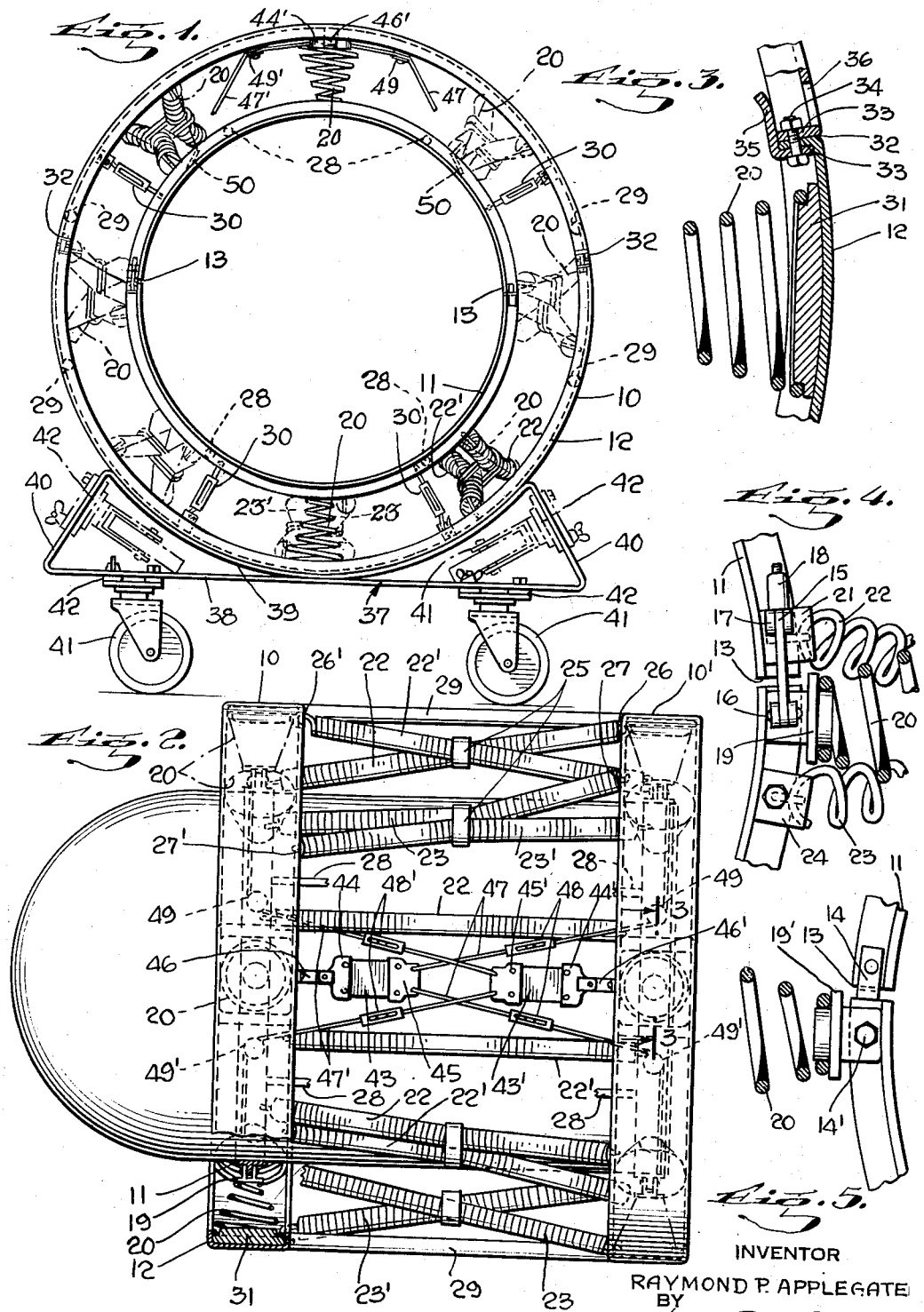
INVENTOR
RAYMOND P. APPLEGATE
BY
ATTORNEY Patented Feb. 23, 1954

2,670,166

UNITED STATES PATENT OFFICE 2,670,166

YIELDABLE SHIPPING MOUNT FOR MISSILES AND THE LIKE

Raymond P. Applegate, Hicksville, N. Y., assignor of one-half to Charles P. Molla, New Hyde Park, N. Y.

Application June 21, 1952, Serial No. 294,955

12 Claims. (Cl. 248—119)

This invention relates to mounts for use in shipping and/or handling missiles, engines and other articles or apparatus in which care is required to prevent subjecting the apparatus to undue vibration in the handling and shipment thereof. More particularly, the invention comprises a mount comprising inner and outer ring sections detachably and hingedly coupled to facilitate placement of missile or other apparatus in the mount and removal of the same therefrom. Still more particularly, the invention deals with a mount of the character described having detachable means for conveying the mount over a supporting surface, said means being supportable in an inoperative or a non-use position in the crating and shipment of the mount.

The novel features of the invention will be best understood from the following description, when taken together with the accompanying drawing, in which certain embodiments of the invention are disclosed and, in which, the separate parts are designated by suitable reference characters in each of the views and in which:

Fig. 1 is an end view of a mount made according to my invention, diagrammatically illustrating parts of the mount.

Fig. 2 is a plan view of the structure shown in Fig. 1, with part of the construction broken away and in section.

Fig. 3 is a partial section on the line 3—3 of Fig. 2.

Fig. 4 is an enlarged detail view illustrating the coupling between the rings employed, as well as the mounting of springs on the rings; and Fig. 5 shows the pivotal coupling between the rings and part of another spring mounting.

In practice, I provide a frame construction comprising two pairs of inner and outer rings, one pair of rings being indicated at 10 at the left of Fig. 2 and the other pair at 10' at the right of Fig. 2. These two pairs of rings are substantially of the same construction. Thus, the brief description of one pair will apply to both pairs. In Fig. 1 of the drawing, I have shown a side view of the pair 10 of rings and, in said figure, 11 shows the inner ring and 12 the outer ring.

The ring 11 is substantially of T-cross-sectional form, as noted in section at the lower portion of Fig. 2; whereas, the ring 12 is in the form of a wide channel with the channel directed inwardly. The rings 11 are split along the horizontal center, as indicated at 13; note also, in this connection, Figs. 4 and 5 and, at one side, the rings have a pivotal coupling through a link 14, note Fig. 5; whereas, at the opposite side, the swinging link 15 is pivoted, as seen at 16, to one part of the ring and engages a forked portion 17 on the other part, against which the link is clamped by a nut 18. The pivot at 16 constitutes part of a bracket 19 which forms a seat for a conical spring 20; whereas, the forked portion 17 constitutes part of a bracket 21, to which one of the longitudinal springs 22 of the mount is coupled, the other companion spring 23 being secured to a bracket 24, all as clearly seen in Fig. 4 of the drawing.

Several of the longitudinal springs 22 and 23 are employed and these are arranged in pairs which are centrally clamped, as seen at 25, to companion springs 22', 23' of the associated pair of rings 10'. The springs 22, 23 extend for example, to the outer ring 12 and are coupled with the channel portions thereof, as indicated for example at 26 where the spring 22 couples with the outer ring of the ring pair 10' and where spring 23 couples with the same outer ring, as at 27. In like manner, it will appear that the spring 22' couples with the outer ring of the pair 10, as at 26', and spring 23' couples with the same ring as at 27'. Pairs of the longitudinal springs extend or are spaced around the entire mount in the manner diagrammatically illustrated in Fig. 1 of the drawing.

The inner rings have coupling bars or rods 28 maintaining the spaced relationship of these rings and similar bars or rods 29 join the outer rings. It will also appear from a consideration of Fig. 1 of the drawing that the inner and outer rings in each pair are joined together by turnbuckles, as at 30, these turnbuckles having pivotal mounting on the rings so as to facilitate free flexure of the inner and outer rings one with respect to the other. The inner and outer rings are joined by six of the conical springs 20, some of which are diagrammatically illustrated and these springs have mounts, similar to the brackets 19, at their inner small ends of the ring 11 and the outer ends of these springs seat on plates 31 secured in the channel of the outer ring, one of these plates and mounts being clearly illustrated in Fig. 3 of the drawing.

It will be apparent that the outer ring is divided at a point above the horizontal center, as at 32, note Fig. 3 and also indicated in Fig. 1 of the drawing and, at this point of juncture, the separate parts of the outer ring have abutting inwardly extending flanges 33 which are bolted together, as at 34, the bolt also securing in place an L-shaped bracket plate 35. It will also appear that the upper section of the outer ring 12 has an opening, as at 36, to give access to the bolt to facilitate coupling and uncoupling. Upon removal of the outer ring, the inner ring can be swung on the pivot link 14. On the other hand, the inner ring may be detached by removal of the bolt 14', note Fig. 5 of the drawing. This bolt passes through a spring seating bracket 19' substantially similar to the bracket 19 of Fig. 4, the latter differing simply in having the pivot mounting 16 for the link 15.

Secured to the lower portion of each of the outer rings 12 is a wheel supporting frame 37, note Fig. 1, this frame being in the form of an elongated strip fashioned to form a straight lower portion 38 and a curved lower portion 39 secured to and forming part of the ring 12. These portions are joined by diverging end plates 40. Wheels or casters 41 are supportably clamped on the lower part 38, as seen at 42, when the casters are in use and, when not in use, the same clamps can be utilized to support the casters on the angular extensions 40 in the manner indicated in dot and dash lines, this position being assumed by the parts when the mount is packed for shipment, it being understood that a suitable casing or outer frame, not shown, is utilized for this purpose.

In addition to the resilient supports between the inner and outer rings as provided by the conical springs and the longitudinal springs joining the pairs of rings, I provide a dampener or stabilizing mechanism to minimize degree of vibration and to control, through adjustment of turnbuckles employed, the harmonics of any yieldable support of a missile, engine or the like in the mount, when subjected to vibratory motion while in transit. These controls comprise two rubber strips 43, 43' having plates 44, 45; 44', 45' secured to end portions thereof. The plates 44, 44' have a pivotal link coupling 46, 46' with the outer ring 12 of each pair of rings and coupled with the plates 45, 45' are rods or cables 47, 47', in which turnbuckles 48, 48' are arranged, the cables extending around pulleys 49, 49' mounted on inner surfaces of the outer ring 12 and then to the inner ring, one of which connections is noted at 50 in Fig. 1 of the drawing for the cables 47'.

These rubber blocks or strips 43, 43' controlled by tightening or loosening the turnbuckles 48, 48' will operate to control the vibratory resilient motion of the missile or other apparatus supported in the mount. It will, of course, be understood that the type of springs employed in the conical springs 20 and the long springs 22, 22'; 23, 23' will govern the load capacity of the apparatus supported in the mount.

In the use of the apparatus, it will be understood that the inner rings can be opened by simply swinging the link 15 into opened position and these rings swung on their pivots 14 sufficiently to assemble a missile or the like in the mount, without disturbing the couplings, as at 34, after which, the inner rings can be tightened around the missile or other apparatus, after which the turnbuckles 48, 48' can be adjusted to the desired extent to control yielding or resilient properties of the inner ring. It will be apparent that the turnbuckles are employed to place the conical springs 20 under a predetermined load and these turnbuckles are kept in a tightened state to hold the inner and outer ring sections when separated in coupled relationship for storage or shipment in a knockdown state. If found necessary, the turnbuckles may be tightened to a slight extent in the operation of opening the inner ring after the link 15 has been opened to facilitate swinging on the pivot ring 14 sufficiently to clear the missile. Only slight movement is required to provide the coupling and uncoupling of the missile. The pivotal mountings of the turnbuckles facilitate the above operation.

In other instances, the separate halves of the two pairs of rings can be separated and the missile or other apparatus seated in the lower portions of the inner rings and then the other portions of both inner and outer rings coupled with their associated halves. It will further be apparent that, by providing the wheel or caster supports for the mount, the apparatus can then be conveniently manipulated over a floor or other surfaces, thus facilitating handling thereof.

It will be understood that the turnbuckles 30 are desirable to hold the ring halves in predetermined relationship with respect to each other against the preloading of the springs so as to facilitate handling of these halves in the operation of attaching the mount to a missile or other apparatus and in detaching the same therefrom.

In Fig. 2 of the drawing, the diagrammatic showing represents a missile which is illustrated as supported in the inner ring, the missle projecting at the left side of the mount. As previously stated, the entire mount is arranged in a shipping case or frame and this frame would be extended to protect the protruding portion of the missile.

Having fully described my invention, what I claim as new and desire to secure by Letters Patent is:

1. A mount for apparatus of the character described, comprising two pairs of inner and outer rings, means coupling and spacing the inner rings, means coupling and spacing the outer rings, conical springs spaced circumferentially between inner and outer rings of each pair to yieldably support the inner rings within said outer rings, pairs of longitudinal springs spaced circumferentially of said pairs of rings, one longitudinal spring in each pair extending from the outer to the inner ring, the other longitudinal spring in each pair extending from the outer ring of an opposed pair to the inner ring of the first named pair, and adjustable means coupling inner and outer rings of each pair to maintain the first named conical springs under predetermined load.

2. A mount for apparatus of the character described, comprising two pairs of inner and outer rings, means coupling and spacing the inner rings, means coupling and spacing the outer rings, conical springs spaced circumferentially between inner and outer rings of each pair to yieldably support the inner rings within said outer rings, pairs of longitudinal springs spaced circumferentially of said pairs of rings, one longitudinal spring in each pair extending from the outer to the inner ring, the other longitudinal spring in each pair extending from the outer ring of an opposed pair to the inner ring of the first named pair, adjustable means coupling inner and outer rings of each pair to maintain the first named conical springs under predetermined load, said inner and outer rings being split to form ring sections, and means detachably coupling the sections of each ring.

3. A mount for apparatus of the character described, comprising two pairs of inner and outer rings, means coupling and spacing the inner rings, means coupling and spacing the outer rings, conical springs spaced circumferentially between inner and outer rings of each pair to yieldably support the inner rings within said outer rings, pairs of longitudinal springs spaced circumferentially of said pairs of rings, one longitudinal spring in each pair extending from the outer to the inner ring, the outer longitudinal spring in each pair extending from the outer ring of an opposed pair to the inner ring of the first named pair, adjustable means coupling inner and outer rings of each pair to maintain the first named conical springs under predetermined load, said inner and outer rings being split to form ring sections, means detachably coupling the sections of each ring, the detachable coupling of the inner rings comprising a pivotal coupling at one of the splits, and a swingable adjustable link coupling the other split portion of the ring.

4. A mount for apparatus of the character described, comprising two pairs of inner and outer rings, means coupling and spacing the inner rings, means coupling and spacing the outer rings, conical springs spaced circumferentially between inner and outer rings of each pair to yieldably support the inner rings within said outer rings, pairs of longitudinal springs spaced circumferentially of said pairs of rings, one longitudinal spring in each pair extending from the outer to the inner ring, the outer longitudinal spring in each pair extending from the outer ring of an opposed pair to the inner ring of the first named pair, adjustable means coupling inner and outer rings of each pair to maintain the first named conical springs under predetermined load, said inner and outer rings being split to form ring sections, means detachably coupling the sections of each ring, the detachable coupling of the inner rings comprising a pivotal coupling at one of the splits, a swingable adjustable link coupling the other split portion of the ring, means stabilizing relative movement of said inner and outer rings, and said means bridging the pairs of rings and coupling outer rings of one pair with inner rings of the opposed pair.

5. A mount for apparatus of the character described, comprising two pairs of inner and outer rings, means coupling and spacing the inner rings, means coupling and spacing the outer rings, conical springs spaced circumferentially between inner and outer rings of each pair to yieldably support the inner rings within said outer rings, pairs of longitudinal springs spaced circumferentially of said pairs of rings, one longitudinal spring in each pair extending from the outer to the inner ring, the outer longitudinal spring in each pair extending from the outer ring of an opposed pair to the inner ring of the first named pair, adjustable means coupling inner and outer rings of each pair to maintain the first named conical springs under predetermined load, said inner and outer rings being split to form ring sections, means detachably coupling the sections of each ring, the detachable coupling of the inner rings comprising a pivotal coupling at one of the splits, a swingable adjustable link coupling the other split portion of the ring, means stabilizing relative movement of said inner and outer rings, said means bridging the pairs of rings and coupling outer rings of one pair with inner rings of the opposed pair, and means for adjusting said stabilizing means.

6. A mount for apparatus of the character described, comprising two pairs of inner and outer rings, means coupling and spacing the inner rings, means coupling and spacing the outer rings, conical springs spaced circumferentially between inner and outer rings of each pair to yieldably support the inner rings within said outer rings, pairs of longitudinal springs spaced circumferentially of said pairs of rings, one longitudinal spring in each pair extending from the outer to the inner ring, the other longitudinal spring in each pair extending from the outer ring of an opposed pair to the inner ring of the first named pair, adjustable means coupling inner and outer rings of each pair to maintain the first named conical springs under predetermined load, and adjustable yieldable means bridging the pairs of rings and coupling the outer rings of one pair with the inner rings of the opposed pair for stabilizing relative movement between said rings.

7. A mount for apparatus of the character described, comprising two pairs of inner and outer rings, means coupling and spacing the inner rings, means coupling and spacing the outer rings, conical springs spaced circumferentially between inner and outer rings of each pair to yieldably support the inner rings within said outer rings, pairs of longitudinal springs spaced circumferentially of said pairs of rings, one longitudinal spring in each pair extending from the outer to the inner ring, the other longitudinal spring in each pair extending from the outer ring of an opposed pair to the inner ring of the first named pair, adjustable means coupling inner and outer rings of each pair to maintain the first named conical springs under predetermined load, adjustable yieldable means bridging the pairs of rings and coupling the outer rings of one pair with the inner rings of the opposed pair for stabilizing relative movement between said rings, and conveyor wheels detachably mounted in connection with each pair of rings.

8. A yieldable mount for apparatus of the character described, comprising two pairs of spaced rings, each pair of rings comprising inner and outer ring members with yieldable means disposed between said members, each member being divided into separate sections, means detachably coupling said sections, and yieldable means extending longitudinally of the mount and spaced circumferentially of said pairs of rings for joining the outer rings of one pair with the inner rings of an opposed pair.

9. A yieldable mount for apparatus of the character described, comprising two pairs of spaced rings, each pair of rings comprising inner and outer ring members with yieldable means disposed between said members, each member being divided into separate sections, means detachably coupling said sections, yieldable means extending longitudinally of the mount and spaced circumferentially of said pairs of rings for joining the outer rings of one pair with the inner rings of an opposed pair, and means coupling the sections of the inner ring members with the sections of the outer ring members in predetermined yieldable load relationship to each other.

10. A yieldable mount for apparatus of the character described, comprising two pairs of spaced rings, each pair of rings comprising inner and outer ring members with yieldable means disposed between said members, each member being divided into separate sections, means detachably coupling said sections, yieldable means extending longitudinally of the mount and spaced circumferentially of said pairs of rings for joining the outer rings of one pair with the inner rings of an opposed pair, means coupling the sections of the inner ring members with the sections of the outer ring members in predetermined yieldable load relationship to each other, and adjustable means for dampening relative movement of the inner ring members with respect to the outer ring members.

11. A mount of the character described, comprising inner and outer rings, conical springs positioned between said inner and outer rings, means placing said springs under predetermined load, and yieldable means controlling movement of the inner ring axially with respect to the outer ring.

12. A mount of the character described, comprising two pairs of inner and outer rings, preloaded conical springs disposed between said rings, the inner rings being split, means for opening and closing said split rings, and yieldable means for supporting the inner rings against movement axially with respect to the outer rings.

RAYMOND P. APPLEGATE.

References Cited in the file of this patent

UNITED STATES PATENTS

| Number | Name | Date |
|---|---|---|
| 2,241,822 | Marsh | May 13, 1941 |
| 2,394,853 | Goddard | Feb. 12, 1946 |
| 2,446,518 | Arnold et al. | Aug. 10, 1948 |
| 2,493,788 | Turlay | Jan. 10, 1950 |
| 2,494,170 | Goldfield et al. | Jan. 10, 1950 |

FOREIGN PATENTS

| Number | Country | Date |
|---|---|---|
| 567,323 | Great Britain | Feb. 8, 1945 |